US011069230B2

(12) United States Patent
Lim

(10) Patent No.: US 11,069,230 B2
(45) Date of Patent: Jul. 20, 2021

(54) IN-VEHICLE DEVICE AND METHOD FOR PROVIDING TRAFFIC LIGHT INFORMATION THEREOF

(71) Applicants: Hyundai Motor Company, Seoul (KR); Kia Motors Corporation, Seoul (KR)

(72) Inventor: Ik Soon Lim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/743,657

(22) Filed: Jan. 15, 2020

(65) Prior Publication Data

US 2021/0043073 A1 Feb. 11, 2021

(30) Foreign Application Priority Data

Aug. 6, 2019 (KR) .................. 10-2019-0095373

(51) Int. Cl.
*G08G 1/01* (2006.01)
*G06N 5/04* (2006.01)
*G06K 9/00* (2006.01)

(52) U.S. Cl.
CPC ....... *G08G 1/0129* (2013.01); *G06K 9/00825* (2013.01); *G06N 5/04* (2013.01); *G08G 1/0112* (2013.01)

(58) Field of Classification Search
CPC .............. G08G 1/0129; G08G 1/0112; G06K 9/00825; G06N 5/04
USPC ........................................................ 340/929
See application file for complete search history.

(56) References Cited

U.S. PATENT DOCUMENTS

| | | | |
|---|---|---|---|
| 2019/0084507 A1* | 3/2019 | Nishijima | G06K 9/00818 |
| 2019/0215378 A1* | 7/2019 | Munishwar | H04W 4/027 |
| 2019/0256108 A1* | 8/2019 | Emura | B60W 50/14 |
| 2020/0135030 A1* | 4/2020 | Krivokon | G06K 9/00798 |
| 2020/0286371 A1* | 9/2020 | Yuasa | G08G 1/09675 |
| 2020/0410263 A1* | 12/2020 | Gao | G06K 9/00825 |

* cited by examiner

*Primary Examiner* — Omar Casillashernandez
(74) *Attorney, Agent, or Firm* — Mintz Levin Cohn Ferris Glovsky and Popeo, P.C.; Peter F. Corless

(57) ABSTRACT

An in-vehicle device and a method for providing traffic light information by the in-vehicle device are provided. The in-vehicle includes a camera that photographs a front side of a vehicle and a processor that detects traffic light information by recognizing a traffic light in an image captured by the camera. The detected traffic light information is stored cumulatively and the controller provides traffic light prediction information for the traffic light, based on the accumulated traffic light information.

13 Claims, 5 Drawing Sheets

IN-VEHICLE DEVICE AND METHOD FOR PROVIDING TRAFFIC LIGHT INFORMATION THEREOF

CROSS-REFERENCE TO RELATED APPLICATION

This application claims the benefit of priority to Korean Patent Application No. 10-2019-0095373, filed on Aug. 6, 2019, the entire contents of which are incorporated herein by reference.

TECHNICAL FIELD

The present disclosure relates to an in-vehicle device and a method for providing traffic light information thereof.

BACKGROUND

A Vehicle to Everything (V2X) system is a technology for exchanging and sharing a variety of useful information, such as a traffic condition, a state of a traffic light, and the like, while consistently communicating with a road infrastructure or other vehicles during operation of a vehicle. In particular, V2X refers to vehicle-to-everything communication, such as Vehicle to Vehicle (V2V) and/or Vehicle to Infrastructure (V2I), for exchanging information using wired/wireless communication.

However, the V2X system requires application of an additional terminal to the vehicle and therefore causes an increase in material cost. Furthermore, due to high dependency on an infrastructure, the V2X system is unable to exchange and share information when an infrastructure such as a traffic light does not have a V2X communication function, and hence it is difficult to provide accurate information.

SUMMARY

The present disclosure provides an in-vehicle device for collecting and cumulatively storing information regarding a traffic light on a driving route using a camera mounted within a vehicle and providing traffic light information based on the accumulated information, and a method for providing traffic light information by the in-vehicle device.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an in-vehicle device may include a camera configured to photograph a front side of a vehicle and a processor configured to detect traffic light information by recognizing a traffic light in an image captured with the camera, cumulatively store the detected traffic light information, and provide traffic light prediction information for the traffic light, based on the accumulated traffic light information.

The traffic light information may include at least one of a current signal, a signal type, and signal holding time. The processor may be configured to determine whether to provide the traffic light prediction information, based on whether the number of cumulative data matching the traffic light exceeds a threshold value. The processor may be configured to perform a simplified test based on data accumulated up to the present, when the number of cumulative data matching the traffic light is less than the threshold value, and the processor may be configured to determine that the traffic light prediction information is able to be provided, when a simplified test result shows that prediction information is correct continuously a predetermined number of times or more.

Additionally, the processor may be configured to estimate a signal change time point of the traffic light, based on cumulative data matching the traffic light. The processor may be configured to calculate a parameter based on the cumulative data according to a statistical analysis method, calculate a confidence level of the cumulative data and a confidence interval based on the confidence level, and determine a lower limit of the confidence interval to be the signal change time point. The processor may be configured to delete all cumulative data matching the traffic light, when the traffic light prediction information is faulty.

According to another aspect of the present disclosure, a method for providing, by an in-vehicle device, traffic light information may include obtaining an image through a camera mounted within a vehicle, detecting traffic light information by detecting a traffic light in the image, and cumulatively storing the traffic light information and providing traffic light prediction information for the traffic light, based on the accumulated traffic light information.

The detecting of the traffic light information may include detecting at least one of a current signal, a signal type, and signal holding time of the traffic light. The method may further include determining whether the traffic light prediction information is able to be provided, based on cumulative data matching the traffic light, prior to providing the traffic light prediction information. The determining of whether the traffic light prediction information is able to be provided may include determining whether the traffic light prediction information is able to be provided, based on whether the number of cumulative data matching the traffic light exceeds a threshold value.

The method may further include performing a simplified test based on data accumulated up to the present, when the number of cumulative data matching the traffic light does not exceed the threshold value and determining that the traffic light prediction information is able to be provided, when a simplified test result shows that prediction information is correct continuously a predetermined number of times or more. The providing of the traffic light prediction information may include outputting at least one of a current signal, a signal change time point, and the next signal of the traffic light, in response to determining that the traffic light prediction information is able to be provided.

The providing of the traffic light prediction information may further include setting a confidence level of the cumulative data and a confidence interval based on the confidence level by calculating a parameter based on the cumulative data according to a statistical analysis method and determining a lower limit of the set confidence interval to be the signal change time point. The determining of whether the traffic light prediction information is able to be provided may further include cumulatively storing the detected traffic light information in a storage space matching the traffic light, in response to determining that the traffic light prediction information is unable to be provided. Additionally, the method may include deleting all cumulative data matching the traffic light, when the traffic light prediction information is faulty.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
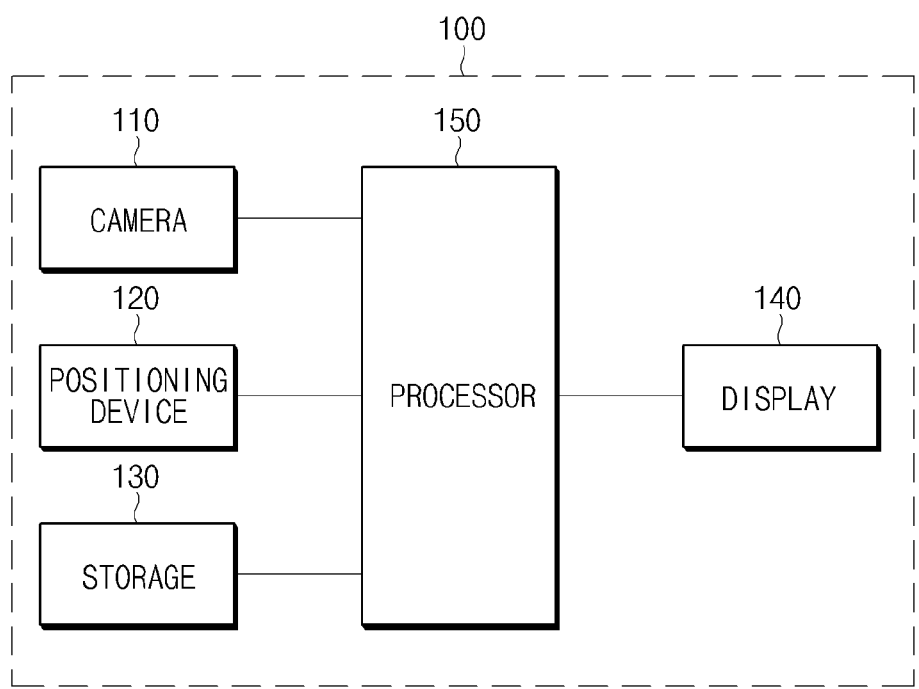
FIG. 1 is a block diagram of an in-vehicle device according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the exemplary embodiment according to the present disclosure, terms such as first, second, "A", "B", (a), (b), and the like may be used. These terms are merely intended to distinguish one component from another component, and the terms do not limit the nature, sequence or order of the components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
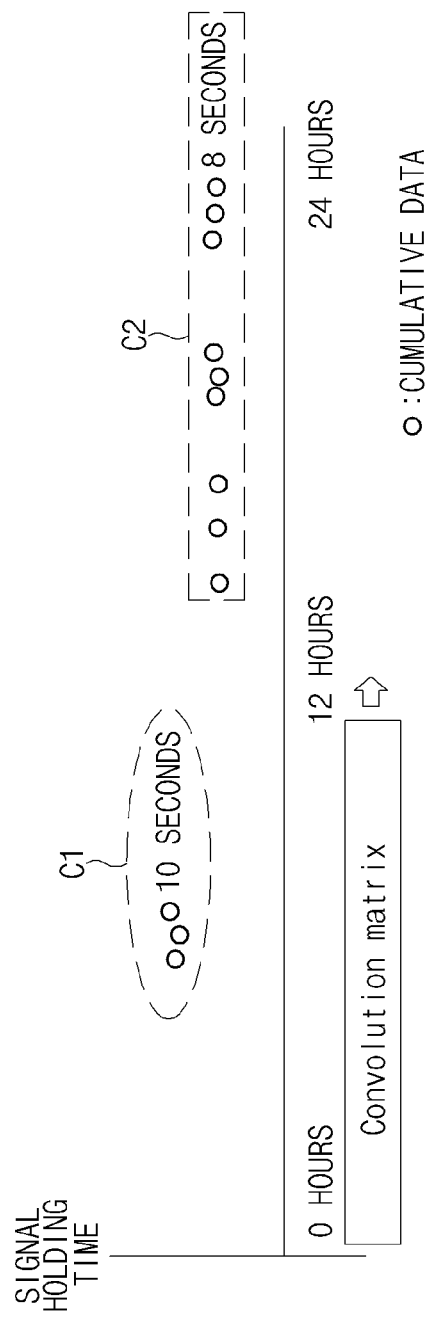
FIGS. 2 and 3 are views illustrating a data classification method according to an exemplary embodiment of the present disclosure.
Figure 3:
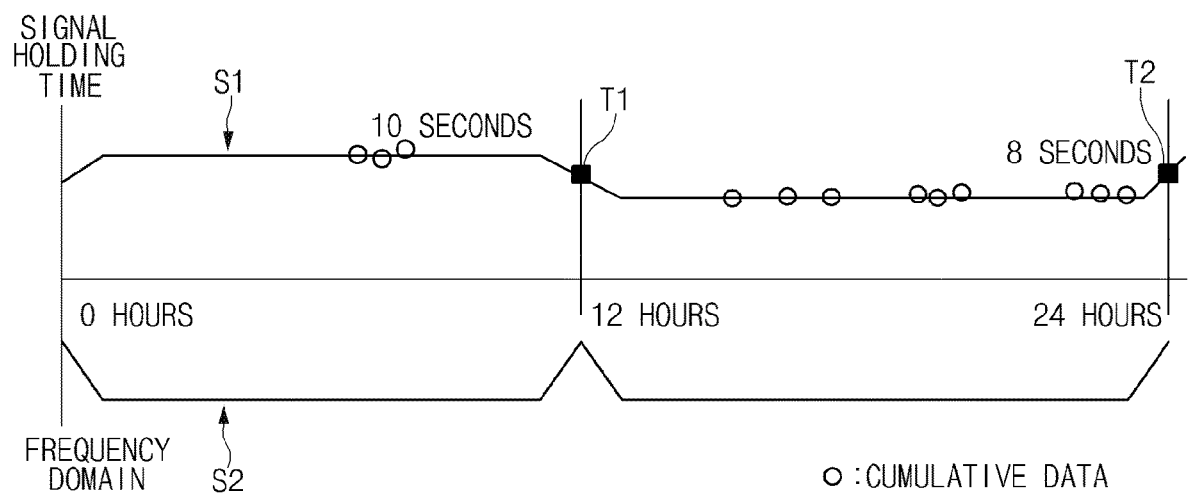

FIG. 1 is a block diagram of an in-vehicle device according to an exemplary embodiment of the present disclosure, and FIGS. 2 and 3 are views illustrating a data classification method according to an exemplary embodiment of the present disclosure. Referring to FIG. 1, the in-vehicle device 100 may include a camera 110 or other imaging device, a positioning device 120, storage 130, a display 140, and a processor 150. The in-vehicle device 100 may be an Audio Video Navigation (AVN) or a telematics terminal. The processor 150 may be part of a controller programmed to operate the other components of the device 100.

The camera 110 may be mounted within a vehicle to photograph or capture a front side or front direction of the vehicle. Additionally, the camera 110 may be configured to output the captured image to the processor 150. The camera 110 may be implemented with at least one image sensor among image sensors such as a Charge Coupled Device (CCD) image sensor, a Complementary Metal Oxide Semiconductor (CMOS) image sensor, a Charge Priming Device (CPD) image sensor, and a Charge Injection Device (CID) image sensor. The camera 110 may include an image processor configured to perform image processing, such as noise removal, color reproduction, file compression, image quality adjustment, and color saturation adjustment, on an image obtained using an image sensor. The positioning device 120 may be configured to measure or detect the current position of the vehicle, that is, the vehicle position. The positioning device 120 may specifically be configured to measure the vehicle position using at least one of positioning technologies such as a Global Positioning System (GPS), Dead Reckoning (DR), a Differential GPS (DGPS), and a Carrier phase Differential GPS (CDGPS).

The storage 130 may be configured to store map information and store a program for operating the processor 150.

The storage 130 may be configured to store traffic light index information and cumulative data for respective traffic lights. The storage 130 has a storage space in which data for each traffic light may be cumulatively stored. In addition, the storage 130 may be implemented with at least one storage medium (recording medium) among storage media such a flash memory, a hard disk, a Secure Digital (SD) card, a Random Access Memory (RAM), a Static Random Access Memory (SRAM), a Read Only Memory (ROM), a Programmable Read Only Memory (PROM), an Electrically Erasable and Programmable ROM (EEPROM), an Erasable and Programmable ROM (EPROM), a register, a removable disk, and web storage.

Further, the display 140 may be configured to output a progress status and/or an outcome based on an operation of the processor 150. The display 140 may also be configured to output traffic light prediction information, for example, a signal change time point and the next signal. The display 140 may include at least one of a Liquid Crystal Display (LCD), a Thin Film Transistor-Liquid Crystal Display (TFT LCD), an Organic Light-Emitting Diode (OLED) display, a flexible display, a three-Dimensional (3D) display, a transparent display, a Head-Up Display (HUD), a touch screen, and a cluster.

The display 140 may include an audio output device such as a speaker that outputs audio data. For example, the display 140 may be configured to display a signal change time point and the next signal of a traffic light located ahead of the vehicle and may be configured to output a sound signal through the speaker. Furthermore, the display 140 may be implemented with a touch screen combined with a touch sensor and may be used as an input device as well as an output device. A touch film or a touch pad may be used as the touch sensor.

The processor 150 may be configured to operate the in-vehicle device 100. The processor 150 may be implemented with at least one of an Application Specific Integrated Circuit (ASIC), a Digital Signal Processor (DSP), Programmable Logic Devices (PLDs), Field Programmable Gate Arrays (FPGAs), a Central Processing Unit (CPU), microcontrollers, and microprocessors. When a destination is set, the processor 150 may be configured to search for a route (e.g., a driving route) from the current position of the vehicle to the destination and perform route guidance along the found route. When no destination is set, the processor 150 may be configured to measure the current position of the vehicle and output, on the display 140, map information onto which the measured current position of the vehicle is mapped.

While the vehicle is being driven, the processor 150 may be configured to obtain an image by photographing a front side using the camera 110. The processor 150 may be configured to recognize or detect a traffic light in the image captured by the camera 110. In particular, the processor 150 may be configured to detect the traffic light in the captured image using a well-known image processing technique. The processor 150 may be configured to identify the position of the vehicle through the positioning device 120, map the identified vehicle position onto the map information, and recognize (e.g., detect or identify) the detected traffic light.

The processor 150 may be configured to extract a traffic light area (e.g., a traffic light image) from the captured image and detect traffic light information such as the types of signals and the current signal by analyzing the extracted traffic light image. Particularly, the type of signals refer to signals that the traffic light is capable of displaying, that is, the types of signal lights of the traffic light. The types of signals include a "go" signal when a green light is turned on, a "caution" signal when a yellow light is turned on, a "turn" signal when a green arrow light (e.g., a green turn signal light) is turned on, a "stop" signal when a red light is turned on, and the like.

The processor 150 may be configured to cumulatively store the detected traffic light information in the storage 130. Particularly, the processor 150 may be configured to cumulatively store the detected traffic light information in the storage space that matches the recognized traffic light. The processor 150 may be configured to index traffic lights on the map and cumulatively store traffic light information corresponding to each of the indexed traffic lights. The traffic light information may include at least one of the position of the traffic light, the types of signals, the holding time of each signal (e.g., the time during which each signal light is turned on), the time point when the signal period is changed (e.g., the signal period change time point), the sequence (cycle, transition) of the signals, and the like.

Further, the processor 150 may be configured to cumulatively store information for each signal based on a 24-hour time table for each traffic light. The processor 150 may be configured to calculate a signal period change time point of the traffic light, based on the accumulated information for the signal. The processor 150 may then be configured to estimate the signal period change time point of the traffic light using a well-known data classification technique. For example, when using a dichotomous classification technique using convolution, the processor 150 may be configured to calculate values over the whole time with a predetermined convolution mask size and determine an area having the highest value to be one cluster and the remaining area to be another cluster.

Referring to FIG. 2, the processor 150 may be configured to sweep a convolution matrix and identify an area having the largest of average values of data input to the convolution matrix. Additionally, the processor 150 may assume the area having the largest average value to be a first cluster C1 and the remaining area to be a second cluster C2. Accordingly, the processor 150 may be configured to determine a time point between the first cluster C1 and the second cluster C2 to be a signal period change time point.

In another example, when using a classification technique using a regression equation and frequency analysis, the processor 150 may be configured to generate a regression equation through regression analysis based on cumulative data. When a regression equation graph S1 is as shown in FIG. 3, the processor 150 may be configured to convert the regression equation graph S1 to a frequency-domain graph S2, detect the positions of high frequencies, that is, peak points by analyzing the converted frequency-domain graph S2, and determine the detected points to be signal period change time points T1 and T2.

The processor 150 may be configured to identify the number of cumulative data for the recognized traffic light. In addition, the processor 150 may be configured to determine whether traffic light prediction information is capable of being provided, based on whether the number of cumulative data exceeds a preset threshold value. For example, when the number of cumulative data is 100 or less, the processor 150 may be configured to determine that the traffic light prediction information is unable to be provided. Meanwhile, when the number of cumulative data is greater than 100, the processor 150 may be configured to determine that the traffic light prediction information is capable of being provided. In other words, the amount of data that is cumulated for the traffic light may be compared with a threshold value to determine whether traffic light prediction information is capable of being provided.

In this exemplary embodiment, it is exemplified that the processor 150 determines whether the traffic light prediction information is capable of being provided, based on the number of cumulative data. However, considering whether the sequence (cycle or transition) of signals is identified, the processor 150 may be configured to determine whether the traffic light prediction information is capable of being provided. For example, when both the previous signal and the next signal with respect to the current signal displayed on a traffic light ahead are identified based on cumulative data, the processor 150 may be configured to determine that traffic light prediction information is capable of being provided.

Furthermore, in this exemplary embodiment, it is exemplified that the processor 150 determines that the traffic light prediction information is unable to be provided, when the number of cumulative data matching the traffic light does not exceed (is less than) the threshold value. However, without being limited thereto, the processor 150 may be configured to determine whether the traffic light prediction information is capable of being provided, by performing a simplified test based on data accumulated up to the present (e.g., a current time), when the number of cumulative data matching the traffic light is less than or equal to the threshold value. For example, when the number of cumulative data matching the traffic light is less than the threshold value, the processor 150 may be configured to perform a simplified test based on data accumulated up to the present and determine that the traffic light prediction information is capable of being provided, when the simplified test result shows that prediction information is correct or accurate continuously a predetermined number of times or more.

The processor 150 may be configured to calculate a parameter of the cumulative data for the recognized traffic light and update a confidence level and a confidence interval based on the calculated parameter. The processor 150 may also be configured to set the confidence level and the confidence interval according to a conventional statistical analysis method. The processor 150 may be configured to determine a signal change time point based on the confidence level and the confidence interval. For example, the processor 150 may be configured to set the confidence level of the cumulative data to about 99%, and when a 99-percent confidence interval is determined to be an interval from about 7.5 seconds to 8.5 seconds in the daytime or an interval from about 9.5 seconds to 10.5 seconds in the night, the processor 150 may be configured to determine the lower limit (the minimum value) of the confidence interval to be the signal change time point (that is, signal holding time).

When the signal change time point is determined, the processor 150 may be configured to output traffic light prediction information based on the determined signal change time point. For example, when the signal change time point is determined to be about 8 seconds, the processor 150 may be configured to output information that provides notification that a green light is turned on, on the display 140 for about 7.5 seconds after the green light is turned on, and the processor 150 may be configured to output a notification such as "Signal will be changed soon" on the display 140 from about 7.5 seconds to 8 seconds after the green light is turned on.

Furthermore, when the signal change time point is determined, the processor 150 may be configured to guide the next signal as well as the signal change time point. For example, when the current signal is a "go" signal and the next signal is a "caution" signal, the processor 150 may be configured to guide a change from the "go" signal to the "caution signal" after about 8 seconds. When the traffic light prediction information is faulty, the processor 150 may be configured to recognize traffic light information using the camera 110 and immediately provide the traffic light information to a driver. The processor 150 may then be configured to delete all cumulative data for the corresponding traffic light for which the traffic light prediction information is faulty, and accumulate data again. Additionally, the processor 150 may be configured to provide no traffic light prediction information for the corresponding traffic light.

Figure 4:
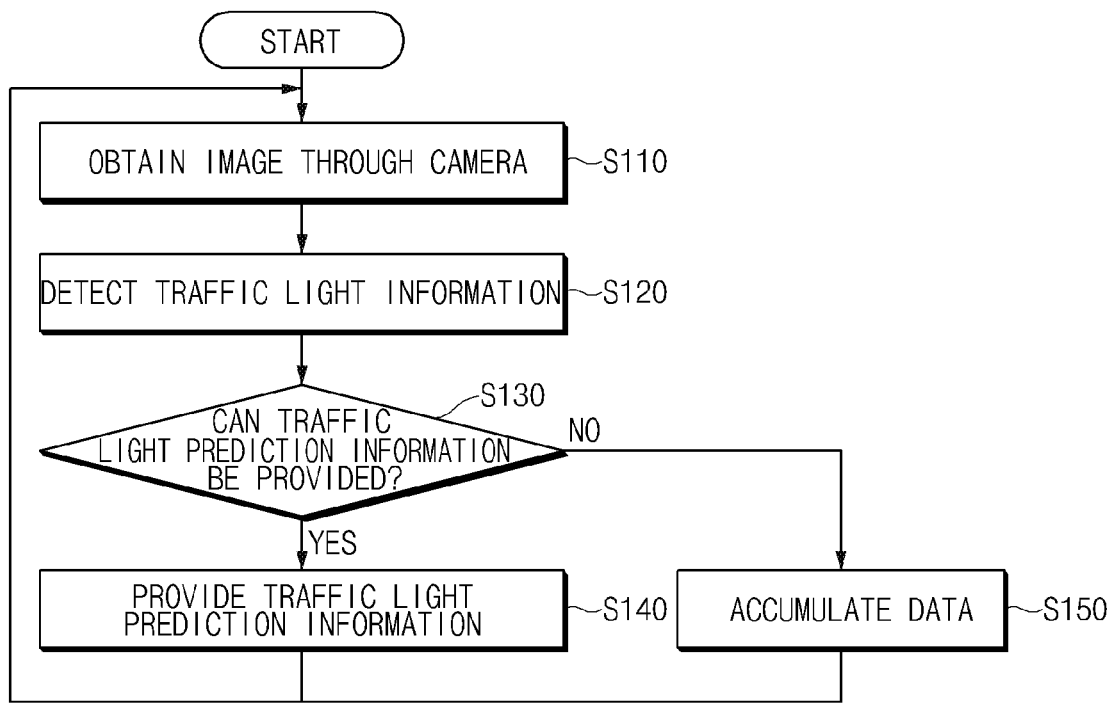
FIG. 4 is a flowchart illustrating a method for providing, by the in-vehicle device, traffic light information according to an exemplary embodiment of the present disclosure.

FIG. 4 is a flowchart illustrating a method for providing, by the in-vehicle device, traffic light information according to an exemplary embodiment of the present disclosure. The processor 150 may be configured to obtain an image using the camera 110 (S110). During operation of the vehicle, the camera 110 may be configured to photograph a front side or direction of the vehicle and transmit the captured image to the processor 150.

The processor 150 may be configured to detect traffic light information from the captured image (S120). Additionally, the processor 150 may be configured to recognize a traffic light in the captured image, based on the current position of the vehicle. The processor 150 may be configured to detect the current signal, the types of signals, and the signal holding time of the traffic light from the captured image using a well-known image processing technique. The processor 150 may also be configured to determine whether traffic light prediction information may be provided (e.g., is capable of being provided), based on cumulative data corresponding to the recognized traffic light (S130). The processor 150 may be configured to identify the number of cumulative data and determine whether the traffic light prediction information may be provided, based on whether the number of cumulative data exceeds a preset threshold value.

In response to determining that the traffic light prediction information may be provided, the processor 150 may be configured to provide the traffic light prediction information to the driver (S140). The processor 150 may further be configured to determine a signal change time point of the recognized traffic light, based on the cumulative data matching the recognized traffic light and determine the changed next signal. The processor 150 may then be configured to calculate a parameter using the cumulative data and set a confidence level (e.g., reliability) and a confidence interval based on the calculated parameter. Additionally, the processor 150 may be configured to determine the lower limit of the confidence interval to be the signal change time point and guide a prediction signal based on the signal change time point. Meanwhile, in response to determining in S130 that the traffic light prediction information is unable to be provided, the processor 150 may be configured to cumulatively store the detected traffic light information (S150). In other words, the processor 150 may be configured to cumulatively store the detected traffic light information in the storage space that matches the recognized traffic light.

Figure 5:
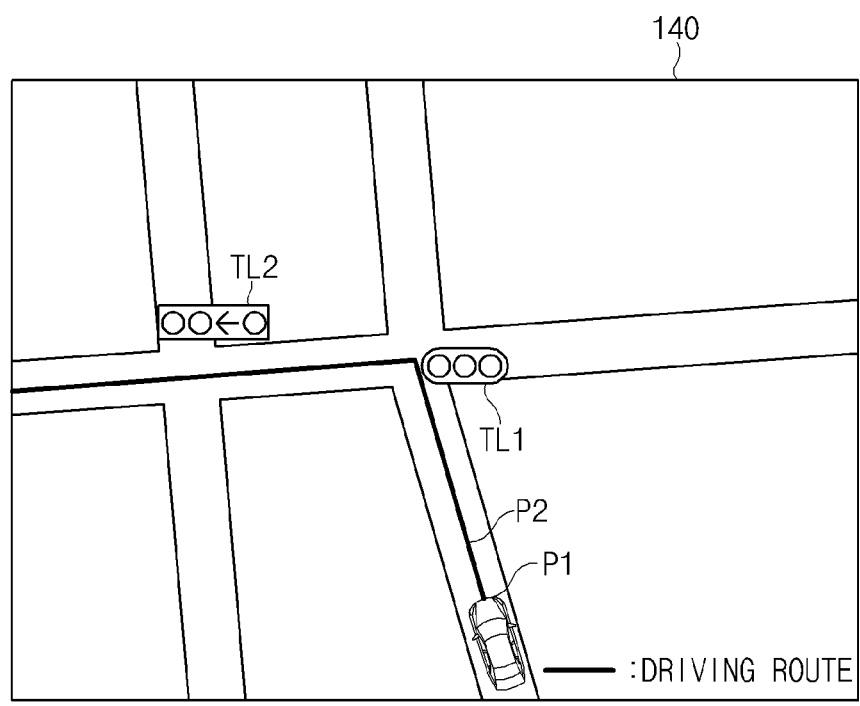
FIG. 5 is an exemplary view illustrating an example of providing traffic light information according to an exemplary embodiment of the present disclosure.

FIG. 5 is an exemplary view illustrating an example of providing traffic light information according to an exemplary embodiment of the present disclosure. Referring to FIG. 5, when traffic lights TL1 and TL2 are present on a driving route of the vehicle, the processor 150 of the in-vehicle device 100 may be configured to recognize or detect the traffic light TL1 located ahead of the vehicle, using the camera 110 (e.g., using an image captured by the imaging device). When the processor 150, at point P1, identifies that the signal of the traffic light TL1 is changed from a "caution" signal to a "stop" signal, the processor 150 may be configured to output an image and a message on the display 140 to inform the driver that the current signal of the traffic light TL1 is the "stop" signal. Thereafter, when the vehicle reaches point P2, the processor 150 may be configured to output a notification that the signal of the traffic light TL1 will be changed from the "stop" signal to a "go" signal after N seconds. Furthermore, since the confidence level of cumulative data for a driving signal is 80%, the processor 150 may be configured to calculate an 80-percent confidence interval of the driving signal and output the lower limit of the calculated confidence interval as driving signal holding time, as shown in Table 1 below.

TABLE 1

| Index | Data | Confidence Level |
|---|---|---|
| Traffic Light 1 (TL1) | Green - Maximum Holding Time of 15 seconds | 80% |
| | Yellow - Maximum Holding Time of 5 seconds | 100% |
| | Red - Maximum Holding Time of 25 seconds | 100% |
| Traffic Light 2 (TL2) | Red - Maximum Holding Time of 15 seconds | 80% |
| | Yellow - Maximum Holding Time of 5 seconds | 100% |
| | Green Left Turn - Maximum Holding Time of 10 seconds | 100% |
| | Green - Maximum Holding Time of 25 seconds | 70% |
| . | . | . |
| . | . | . |
| . | . | . |

According to the present disclosure, the in-vehicle device may be configured to collect and cumulatively store information regarding a traffic light on a driving route using a camera mounted in a vehicle and provide traffic light information based on the accumulated information, thereby preventing an increase in material cost and removing dependency on an infrastructure. Accordingly, the in-vehicle device may be used for a vehicle to which V2X communication is not applied or a vehicle that has V2X communication applied thereto, but has a breakdown in communication or is incapable of communication.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. An in-vehicle device, comprising:
  a camera configured to photograph a front side of a vehicle; and
  a processor configured to detect traffic light information by recognizing a traffic light in an image captured by the camera, cumulatively store the detected traffic light information, and provide traffic light prediction information for the traffic light based on the accumulated traffic light information,
  wherein the processor is configured to calculate a parameter based on cumulative data matching the traffic light according to a statistical analysis method, calculate a confidence level of the cumulative data and a confidence interval based on the confidence level, and determine a lower limit of the confidence interval to be the signal change time point.

2. The in-vehicle device of claim 1, wherein the traffic light information includes at least one selected from the group consisting of: a current signal, a signal type, and signal holding time.

3. The in-vehicle device of claim 1, wherein the processor is configured to determine whether to provide the traffic light prediction information based on whether the number of cumulative data matching the traffic light exceeds a threshold value.

4. The in-vehicle device of claim 3, wherein the processor is configured to perform a test based on data accumulated up to present, when the number of cumulative data matching the traffic light is less than the threshold value, and the processor is configured to determine that the traffic light prediction information is able to be provided, when a test result shows that prediction information is accurate continuously a predetermined number of times or more.

5. The in-vehicle device of claim 1, wherein the processor is configured to delete all cumulative data matching the traffic light when the traffic light prediction information is faulty.

6. A method for providing traffic light information, comprising:
  obtaining, by a processor, an image captured by a camera mounted within a vehicle;
  detecting, by the processor, traffic light information by recognizing a traffic light in the image; and
  cumulatively storing, by the processor, the traffic light information and providing traffic light prediction information for the traffic light based on the accumulated traffic light information,
  wherein the providing of the traffic light prediction information includes;
  setting, by the processor, a confidence level of cumulative data matching the traffic light and a confidence interval based on the confidence level by calculating a parameter based on the cumulative data according to a statistical analysis method; and
  determining, by the processor, a lower limit of the set confidence interval to be a signal change time point.

7. The method of claim 6, wherein the detecting of the traffic light information includes:
  detecting, by the processor, at least one selected from the group consisting of: a current signal, a signal type, and signal holding time of the traffic light.

8. The method of claim 6, further comprising:
  determining, by the processor, whether the traffic light prediction information is able to be provided based on the cumulative data, prior to providing the traffic light prediction information.

9. The method of claim 8, wherein the determining of whether the traffic light prediction information is able to be provided includes:
  determining, by the processor, whether the traffic light prediction information is able to be provided based on whether the number of cumulative data matching the traffic light exceeds a threshold value.

10. The method of claim 9, further comprising:
  performing, by the processor, a test based on data accumulated up to present, when the number of cumulative data matching the traffic light is less than the threshold value; and determining, by the processor, that the traffic light prediction information is able to be provided, when a test result shows that prediction information is accurate continuously a predetermined number of times or more.

11. The method of claim 9, wherein the providing of the traffic light prediction information further includes:
   outputting, by the processor, at least one selected from the group consisting of: a current signal, the signal change time point, and the next signal of the traffic light in response to determining that the traffic light prediction information is able to be provided.

12. The method of claim 9, wherein the determining of whether the traffic light prediction information is able to be provided further includes:
   cumulatively storing, by the processor, the detected traffic light information in a storage space matching the traffic light in response to determining that the traffic light prediction information is unable to be provided.

13. The method of claim 6, further comprising:
   deleting, by the processor, all cumulative data matching the traffic light when the traffic light prediction information is faulty.

\* \* \* \* \*